United States Patent
Kleineberg et al.

(10) Patent No.: US 11,858,340 B2
(45) Date of Patent: Jan. 2, 2024

(54) FUEL DELIVERY DEVICE, FUEL TANK EQUIPPED WITH A FUEL DELIVERY DEVICE OF SAID TYPE, METHOD FOR DETERMINING THE TEMPERATURE OF A FLUID INSIDE A FUEL TANK, METHOD FOR CONTROLLING AND/OR REGULATING AN ELECTRIC MOTOR, AND METHOD FOR CONTROLLING AND/OR REGULATING AN INJECTION OF FUEL VAPORS TO A COMBUSTION PROCESS OF AN INTERNAL COMBUSTION ENGINE

(71) Applicant: Vitesco Technologies GmbH, Regensburg (DE)

(72) Inventors: Stefan Kleineberg, Munich (DE); Dragan Miletic, Munich (DE); Marc Völker, Munich (DE); Marcus Koch, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 17/741,899

(22) Filed: May 11, 2022

(65) Prior Publication Data
US 2022/0363126 A1    Nov. 17, 2022

(30) Foreign Application Priority Data
May 12, 2021  (DE) .................. 10 2021 204 881.1

(51) Int. Cl.
*B60K 15/077*  (2006.01)
*F02M 37/08*  (2006.01)
(Continued)

(52) U.S. Cl.
CPC .......... *B60K 15/077* (2013.01); *F02M 37/08* (2013.01); *G01F 23/38* (2013.01);
(Continued)

(58) Field of Classification Search
CPC ........ B60K 15/077; B60K 2015/03111; B60K 2015/03197; B60K 2015/03217;
(Continued)

(56) References Cited

U.S. PATENT DOCUMENTS 8,136,396 B2 * 3/2012 Mundo .................. G01F 23/38
  73/317
9,772,212 B2 * 9/2017 Manabe .................. G01F 23/38
(Continued)

FOREIGN PATENT DOCUMENTS

CN     102435261    5/2012
DE     10308958     9/2004
(Continued)

OTHER PUBLICATIONS

Office Action of corresponding German Patent Application No. 10 2021 204 881.1.
(Continued)

*Primary Examiner* — George C Jin
(74) *Attorney, Agent, or Firm* — Cozen O'Connor (57) ABSTRACT

A fuel conveying device having a pumping stage, an electric motor to drive the pumping stage, a control unit, a magnetoresistive fill level sensor that generates a fill level signal, including a temperature-effect compensator that generates a compensation signal to compensate for temperature-related influences on the fill level signal, and an evaluation unit (5) designed such that the temperature of a fluid surrounding the fill level sensor can be determined by the evaluation unit by the compensation signal. A fuel tank equipped with a fuel delivery device of said type, a method for determining the temperature of a fluid inside a fuel tank, a method for controlling and/or regulating an electric motor, and a method for controlling and/or regulating an injection of fuel vapors to a combustion process of an internal combustion engine.

19 Claims, 5 Drawing Sheets

(51) Int. Cl.
*G01F 23/38* (2006.01)
*B60K 15/03* (2006.01)
*G05D 23/24* (2006.01)

(52) U.S. Cl.
CPC .............. *B60K 2015/03111* (2013.01); *B60K 2015/03197* (2013.01); *B60K 2015/03217* (2013.01); *G05D 23/24* (2013.01)

(58) Field of Classification Search
CPC ............ B60K 2015/0772; F02M 37/08; G01F 23/38; G05D 23/24
See application file for complete search history.

(56) References Cited

U.S. PATENT DOCUMENTS

| | | |
|---|---|---|
| 2003/0177827 A1 | 9/2003 | Lorenzen |
| 2005/0103103 A1 | 5/2005 | Newman et al. |
| 2007/0151338 A1* | 7/2007 | Benner .................. G01F 23/32 73/317 |
| 2007/0176598 A1 | 8/2007 | Thomas et al. |
| 2014/0116131 A1* | 5/2014 | Forgue .................. G01F 23/38 73/313 |
| 2019/0033119 A1 | 1/2019 | Lease et al. |
| 2020/0141374 A1* | 5/2020 | Graf .................. F02M 37/0076 |
| 2020/0182681 A1* | 6/2020 | Manabe .................. G01F 25/22 |
| 2021/0247226 A1* | 8/2021 | Benner .................. G01F 23/46 |

FOREIGN PATENT DOCUMENTS

| | | | |
|---|---|---|---|
| DE | 102013011409 | 1/2015 | |
| DE | 102017107907 | 10/2018 | |
| DE | 102019203825 | 9/2020 | |
| WO | WO-2006076968 A1 * | 7/2006 | ............. G01D 5/145 |

OTHER PUBLICATIONS

Office Action dated Aug. 19, 2023 issued in Chinese Patent Application No. 202210512187.8.

* cited by examiner

FUEL DELIVERY DEVICE, FUEL TANK EQUIPPED WITH A FUEL DELIVERY DEVICE OF SAID TYPE, METHOD FOR DETERMINING THE TEMPERATURE OF A FLUID INSIDE A FUEL TANK, METHOD FOR CONTROLLING AND/OR REGULATING AN ELECTRIC MOTOR, AND METHOD FOR CONTROLLING AND/OR REGULATING AN INJECTION OF FUEL VAPORS TO A COMBUSTION PROCESS OF AN INTERNAL COMBUSTION ENGINE

BACKGROUND OF INVENTION

1. Field of the Invention

The disclosure relates to a fuel delivery device having a fuel pump, an electric motor that can drive the fuel pump, a control unit, and a magnetoresistive fill level sensor that can generate a fill level signal, comprising a temperature-effect compensator that can generate a compensation signal to compensate for temperature-related influences on the fill level signal. The disclosure relates furthermore to a fuel tank having a fuel delivery device of said type. In addition to this the disclosure relates to a method for determining the temperature of a fluid within a fuel tank. Furthermore, the disclosure relates to a method for controlling and/or regulating an electric motor, and a method for controlling and/or regulating an injection of fuel vapors to a combustion process of an internal combustion engine.

2. Description of Related Art

Due to increasingly strict statutory fuel consumption requirements, for some time now auxiliary units of internal combustion engines have been required to contribute to reducing consumption. Whereas in the past fuel delivery devices have been operated in such a way that a quantity of fuel that exceeded the current demand was supplied to the internal combustion engine and the excess quantity was fed back into the fuel tank, which resulted in a corresponding loss of power, a demand-oriented regulation of fuel delivery devices has now become established. This has significantly reduced the energy consumption of the fuel delivery devices. However, this solution involves, inter alia, determining the fuel temperature of the fuel to be conveyed in order to ensure the most accurate regulation of the fuel delivery device or to operate the fuel pump with a warm-up procedure at low fuel temperatures. For this reason, the prior art provides for the use of a dedicated temperature sensor in the fuel tank to determine the fuel temperature.

Document DE 10 2013 011 409 A1 discloses a kit for a wide range of different fuel delivery devices, each having a dedicated temperature sensor.

Document DE 10 2017 107 907 A1 discloses a method for regulating an electric motor that can drive a pumping stage of a fuel delivery device, wherein a fuel pressure measured by a pressure sensor, a fuel temperature measured by a dedicated temperature sensor, and a phase current, measured by a current sensor, is transmitted to a control unit which uses these measured values to regulate the electric motor and thus the pumping stage of the fuel delivery device.

Document DE 10 308 958 A1 discloses a magnetically passive fill level sensor, which is designed as a fill level sensor. Due to their reliability and robustness against fuels, such sensors are preferred for use as fuel fill level sensors inside fuel tanks. Their function and measurement accuracy are also independent of the fuel temperature in the fuel tank.

Document DE 10 2019 203 825 A1 discloses a magnetoresistive fill level sensor for determining the fill level of fuel in a fuel tank. Magnetoresistive level sensors, however, have not become established in comparison with magnetically passive fill level sensors due to their higher costs in individual cases. The additional costs are associated with the effort required to reliably seal a magnetoresistive level sensor against the fuel.

The disadvantage of the prior-art devices is in particular that to determine the fuel temperature a dedicated temperature sensor is provided, which, together with the associated installation effort for the temperature sensor and the provision of a separate electrical cable for transmitting the temperature sensor measurement signal to a control unit, gives rise to undesirably high complexity and associated costs.

SUMMARY OF THE INVENTION

One aspect of the present invention is to provide a fuel delivery device that enables an uncomplicated and cost-effective determination of the temperature of a fluid within a fuel tank. In addition, a further aspect of the invention consists in providing a fuel tank having a fuel delivery device of said type. In addition, a further object of the invention is to provide a method for determining the temperature of a fluid within a fuel tank. In addition, two further aspects of the invention are to provide a method for controlling and/or regulating an electric motor and a method for controlling and/or regulating an injection of fuel vapors to a combustion process of an internal combustion engine.

The fuel delivery device comprises an evaluation unit which is designed in such a way that the evaluation unit can determine the temperature of a fluid surrounding the fill level sensor by the compensation signal.

Although in individual cases magnetoresistive fill level sensors can be more expensive in direct comparison to magnetically passive fill level sensors due to their more elaborate sealing against fuel and therefore there are strong reservations in the professional world regarding the use of magnetoresistive level sensors for fuel delivery devices, the present invention allows a separate temperature sensor to be dispensed with. In other words, the costs of the device according to one aspect of the invention, which can be used to determine the fill level within a fuel tank and to determine the temperature of a fluid inside the fuel tank, are lower than the costs of a magnetically passive fill level sensor with a dedicated temperature sensor, although the costs of the purely magnetoresistive level sensor from the prior art can be higher than the costs of a magnetically passive fill level sensor. This is made possible by the fact that an evaluation unit determines the temperature of the fluid surrounding the fill level sensor from the compensation signal generated by the temperature-effect compensator. This leads to considerable cost savings, as the invention eliminates the need for a dedicated temperature sensor. The need to install such a dedicated temperature sensor is also eliminated, which considerably reduces the installation effort. Magnetoresistive sensors are generally very temperature dependent, which is why it is common for a magnetoresistive sensor to have a temperature-effect compensator that can be used to generate a compensation signal to compensate for temperature-related influences on the fill level signal. Such a temperature-effect compensator is capable of compensating for or correcting a distortion of the fill level signal of the fill level sensor due to temperature changes. In other words, in the choice of a magnetoresistive level sensor a commercial part can be used straightforwardly, without having to perform a costly in-house development of such a fill level sensor. Only the evaluation of the compensation signal is necessary in order to obtain the temperature to be determined, which can be implemented with little effort using the evaluation unit. It may also be necessary to encapsulate the level sensor appropriately to protect it from fuel and fuel vapors.

It is particularly advantageous if the pumping stage is a screw-spindle, side-channel, or peripheral-channel pumping stage. These pumping stages are characterized by a particularly linear relationship between the pump speed and the pump displacement volume flow, thus facilitating the control of the pump displacement volume flow.

It is advantageous if the electric motor is preferably a permanently excited synchronous machine, which is configured as an internal rotor. Such an electric motor usually has a higher degree of efficiency than a comparable mechanically commutated DC motor, since no mechanical commutation losses occur. In such a refinement of the electric motor, the electric motor shaft preferably has a laminated core having permanent magnets, said laminated core forming the rotor, while the external stator surrounding the electric motor shaft has the stator windings that are necessary to generate a rotating magnetic field. The stator windings are preferably designed as concentrated or distributed windings.

It is preferable if the control unit is a control unit for controlling and/or regulating the electric motor, and therefore, in particular, a control unit for controlling and/or regulating the fuel delivery device. In other words, the control unit is designed in such a way that the control unit can be used to control and/or regulate the electric motor, and thus also the fuel delivery device. It is also preferable if the fuel delivery device has a flange and the control unit is arranged within the flange. This provides an extremely compact unit of a fuel delivery device with a control unit for controlling and/or regulating the device. Preferably, the control unit is encapsulated within the flange in a fluid-tight manner, i.e. sealed, so that the control unit electronics are protected against environmental influences and, above all, from the fuel. This ensures the operational reliability of the control unit. It is particularly preferable if such a flange, in which the control unit is arranged, is designed in such a way that by the flange, an opening of a fuel tank through which the fuel delivery device can be inserted into the fuel tank can be sealed in a fluid-tight manner. This prevents fuel or fuel vapor from escaping from the fuel tank when the fuel delivery device is mounted in a fuel tank.

In the context of one aspect of this invention, fluid-tight elements in particular that a leak-tightness exists with respect to fuel and fuel vapor.

In the context of one aspect of this invention, fuel is understood to mean liquid fuel, for example diesel or gasoline.

All values and signals mentioned within the context of one aspect of this invention can be in the form of analog signals or digital signals.

It is preferable if the control unit is not only a control unit for controlling and/or regulating the electric motor, but also an engine control unit for regulating and/or controlling an internal combustion engine to which fuel can be injected by the fuel delivery device. In other words, the control unit is also an engine control unit by which the internal combustion engine can be controlled and/or regulated. In the embodiment in which the control unit is designed to control and/or regulate the electric motor of the fuel delivery device and an internal combustion engine, it is particularly preferable if the control unit is not arranged in the flange of the fuel delivery device, but is accommodated as a separate control unit in a separate control unit housing, which is located, for example, in an engine compartment of a motor vehicle.

It is particularly preferable if the control unit is designed such that the electric motor of the fuel delivery device and/or an internal combustion engine can be regulated and/or controlled by the control unit depending on the temperature of the fluid surrounding the fill level sensor. Preferably, the control and/or regulation is based on the fuel temperature. In other words, the temperature determined by the temperature-effect compensator is used to perform the control and/or regulation. In addition, the control unit may be designed to select, depending on the temperature of the fluid surrounding the fill level sensor, an operating procedure for regulating and/or controlling the electric motor of the fuel delivery device and/or a combustion engine, and to operate the electric motor and/or the combustion engine using the operating procedure. The operating procedure is preferably a warm-up procedure or cold-start procedure or cold-start operating procedure.

It is also advantageous if the magnetoresistive fill level sensor is an AMR sensor, GMR sensor, CMR sensor, TMR sensor or Hall-effect sensor. In other words, sensors based on the anisotropic magnetoresistive effect (AMR effect), the giant magnetoresistance effect (GMR effect), the CMR effect, the TMR effect or the Hall effect can be considered. What these sensors have in common is that their electrical resistance varies as a function of an external magnetic field. This change in the electrical resistance is used to infer the location and/or position of a permanent magnet that generates the magnetic field that influences the electrical resistance of the magnetoresistive fill level sensor. The location and/or position of the permanent magnet in such fill level sensors depends on the fill level, because a change in the level can be converted into a movement of the permanent magnet, for example by a fill level indicator comprising the permanent magnet.

It is also practical if the fill level sensor has a freely programmable memory in which a characteristic map is deposited, i.e. stored, with which the movement of the float and thus of the permanent magnet can be translated into a corresponding fill level signal as a function of the fuel tank geometry. Thus, the fill level sensor can be applied relatively simply to different fuel tanks that differ in shape and/or size, by depositing, i.e. storing, a fuel-tank geometry-specific characteristic map in the freely programmable memory of the fill level sensor. Such a characteristic map reduces the required computing power. Instead of a characteristic map, a transfer function is also conceivable, with which the movement of the permanent magnet can be translated into a corresponding fill level as a function of the fuel tank geometry.

It is practical if the temperature-effect compensator has a temperature sensor. The temperature sensor is preferably designed as a PTC thermistor or NTC thermistor. As a result, a compensation signal can be generated to compensate for temperature-related effects on the fill level signal, as a function of the temperature of the fluid surrounding the fill level sensor. Alternatively, it is practical if the temperature-effect compensator has at least one thermocouple as a temperature sensor, by the thermal voltage of which a compensation signal can be generated as a function of the temperature of the fluid surrounding the fill level sensor to compensate for temperature-related effects on the fill level signal.

It is particularly preferable if the temperature-effect compensator has a temperature sensor that is formed as a diode, at the p-n junction of which the electrical voltage can be measured at constant electrical current in order to generate a compensation signal by the temperature dependence of the corresponding voltage-current characteristic curve.

Alternatively, it is also conceivable that the temperature-effect compensator has a temperature sensor that comprises a bipolar transistor with a base-collector short circuit, in which the electrical voltage between the emitter and the base of the transistor can be measured at a constant electric current in order to generate a compensation signal by the temperature dependence of the corresponding voltage-current characteristic curve. In other words, as a result, a compensation signal can be generated to compensate for temperature-related effects on the fill level signal, as a function of the temperature of the fluid surrounding the fill level sensor. Temperature sensors of this kind can be integrated very easily into an analog circuit, a digital circuit, a mixture of an analog and a digital circuit, an integrated circuit, an application-specific integrated circuit, a microcontroller or a data processing device. Alternatively, one of the temperature sensors is connected to an analog circuit, a digital circuit, a mixture of an analog and a digital circuit, an integrated circuit, an application-specific integrated circuit, a microcontroller, or a data processing device.

It is particularly practical if the temperature sensor is arranged in a common housing with the fill level sensor. It is also preferred if the temperature sensor is arranged on an inner side of a housing wall of the common housing, wherein the housing wall protects the interior space in which the fill level sensor is arranged from a fluid surrounding the housing. Thus, the most direct possible thermal connection between temperature sensor and fluid is possible. It is also preferable if the temperature sensor is arranged below the fill level sensor when the fill level sensor is installed. Below the fill level sensor when the fill level sensor is installed means away from the fill level sensor in the direction of the force of gravity. This means the temperature sensor is in contact with the fuel for heat transfer, even if the fill level is below the fill level sensor. Alternatively, the temperature sensor is arranged at the level of the fill level sensor or a housing of the fill level sensor.

In a further advantageous embodiment, it is preferable if a thermal conductive element is connected to the temperature sensor in a thermally conductive manner. The thermal conductive element of the temperature sensor advantageously extends in a region located below the fill level sensor and/or below the temperature sensor. The thermal conductive element is advantageously able to make direct contact with the fuel given an appropriate fuel fill level. It is also preferable if the thermal conductive element extends from the temperature sensor up to a point or a component that is in direct contact with the fuel given an appropriate fuel level. An improved thermal connection between the temperature sensor and the fuel is established by the thermal conductive element. This accelerates the response of the temperature sensor and the temperature-effect compensator.

It is advantageous if the temperature-effect compensator is designed as a digital, analog, or a mixed digital and analog circuit.

In addition, it is advantageous if the temperature-effect compensator is designed as an integrated circuit, in particular an application-specific integrated circuit. This contributes to the compact design and also reduces the power consumption.

It is particularly advantageous if the temperature-effect compensator is a data processing device that comprises components for generating a compensation signal to compensate for temperature-related effects on the fill level signal. It is particularly practical if the temperature-effect compensator is a data processing device that comprises a processor configured so as to perform the generation of the compensation signal.

The data processing device used for the compensation is preferably the control unit or a microcontroller. It is particularly practical if the fill level sensor comprises the microcontroller. In other words, it is particularly advantageous if the data processing device used for the compensation is a device that also serves another purpose and/or performs another function. It is also particularly preferable if the data processing device becomes the temperature-effect compensator, by a computer program for the compensation comprising commands which, when the program is executed by the device, cause the latter to generate the compensation signal.

It is also practical if the computer program for the compensation is stored on a computer-readable data carrier. In this case, the data processing device used for the compensation, the control unit, or the microcontroller preferably comprises the computer-readable data carrier. Alternatively, it is possible that the data carrier is designed separately from the data processing device used for the compensation, the control unit, or the microcontroller. The data carrier is advantageously a freely programmable memory on which different computer programs for compensation can be stored, depending on the particular application, which take into account the respective compensation requirements which can differ from one another depending on the particular application.

Furthermore, it is practical if the temperature-effect compensator or the computer program for compensation has a stored characteristic map from which a compensation signal can be generated as a function of the temperature of the fluid surrounding the fill level sensor. Such a characteristic map can be determined experimentally, for example. Such a characteristic map reduces the required computing power. Instead of a characteristic map, a transfer function is also conceivable, with which the compensation signal can be generated as a function of the temperature of the fluid surrounding the fill level sensor. In other words, the transfer function can be used to generate a compensation signal as a function of the temperature of the fluid surrounding the fill level sensor.

It is advantageous if the evaluation unit is designed as a digital, analog, or a mixture of a digital and an analog circuit.

In addition, it is advantageous if the evaluation unit is designed as an integrated circuit, in particular an application-specific integrated circuit. This contributes to the compact design and also reduces the power consumption.

It is particularly advantageous if the evaluation unit is a data processing device that comprises elements for performing the evaluation of the compensation signal. It is particularly practical if the evaluation unit is a data processing device that comprises a processor configured to perform the evaluation of the compensation signal.

The data processing device used for the evaluation is preferably the control unit or a microcontroller. In other words, it is particularly advantageous if the data processing device used for the evaluation is a device that also serves another purpose and/or performs another function. It is also particularly preferable if the data processing device becomes the evaluation unit, by a computer program for the evaluation comprising commands which, when the program is executed by the device, cause the latter to evaluate the compensation signal.

It is also practical if the computer program for the evaluation is stored on a computer-readable data carrier. In this case, the data processing device used for the evaluation, the control unit, or the microcontroller preferably comprises the computer-readable data carrier. Alternatively, it is possible that the data carrier is designed separately from the data processing device used for the evaluation, the control unit, or the microcontroller. The data carrier is advantageously a freely programmable memory on which different computer programs for the evaluation can be stored, depending on the application, which take into account the arrangement of the fill level sensor in the fuel tank or the accuracy of the compensation signal of the temperature-effect compensator.

It is also practical if the evaluation unit or the computer program has a stored characteristic map from which the temperature to be determined can be inferred using the compensation signal, i.e. the compensation signal can be evaluated. Such a characteristic map can be determined experimentally, for example. Such a characteristic map reduces the required computing power. Instead of a characteristic map, a transfer function is also conceivable, with which the temperature can be determined from the compensation signal. In other words, the transfer function can be used to convert the compensation signal into a temperature value or a temperature signal.

Furthermore, it is advantageous if the evaluation unit averages the evaluated temperature over a specified time period, which is in particular selected in such a way that temperature fluctuations can be smoothed out. This means that the evaluation unit in particular can determine an average temperature value. This allows temperature fluctuations within the tank to be smoothed out. It is also preferable if the evaluation unit determines a minimum or maximum temperature value within a specified time period. Depending on the specific application for which the determinable temperature is further processed, this means that a safety coefficient for the respective method can be maintained.

A preferred embodiment of one aspect of the invention is characterized in that the fuel delivery device has a selection unit, which is designed in such a way that the evaluation unit is instructed to determine the fuel temperature, the fuel vapor temperature, or no temperature from the compensation signal, depending on the fill level signal.

In other words, the fill level signal can be used to ascertain whether the determinable temperature corresponds to the fuel temperature or the fuel vapor temperature.

Preferably, the determinable temperature corresponds to the fuel temperature when the fill level sensor is surrounded by fuel, in particular when it is in contact with fuel, i.e. connected for heat transfer, and thus the fuel temperature acts on the fill level sensor and/or temperature compensator. Whether the fill level sensor is in contact with fuel or fuel vapor depends on the fill level. It is therefore possible to derive from the fill level signal whether the fuel temperature or the fuel vapor temperature can be determined by the compensation signal.

Preferably, the determinable temperature is the same as the fuel vapor temperature if the fill level sensor is mainly surrounded by fuel vapor, i.e. not surrounded by fuel, because in this condition it can be inferred that the temperature of the fuel vapor is acting on the fill level sensor. An embodiment is also conceivable in which the determination of the fuel vapor temperature is not necessary and therefore superfluous, in which case instead of the fuel vapor temperature no temperature is determined. This reduces the complexity and therefore the cost of the system.

Another preferred exemplary embodiment is characterized in that the selection unit is designed in such a way that, in the case of a fill level signal that corresponds to a fuel fill level at least at the height at which the fill level sensor is arranged, the evaluation unit is instructed to determine the fuel temperature from the compensation signal, and that in the case of a fill level signal that corresponds to a fuel fill level below the position of the fill level sensor, the evaluation unit is instructed to determine the fuel vapor temperature from the compensation signal or not to determine a temperature. Within the scope of this invention, the height of the arrangement is measured in the direction of action of gravity. In particular, the fill level signal corresponds to a fill level threshold, above which the fuel vapor temperature can be determined and below which the fuel temperature can be determined.

In other words, such a selection unit ensures that the temperature that can be determined by the evaluation unit from the compensation signal of the temperature-effect compensator corresponds to the temperature of the fluid which surrounds the fill level sensor, in other words, is in contact with the fill level sensor for heat transfer. This is because a fluid surrounding the fill level sensor transfers its temperature to the fill level sensor and thus also to the temperature-effect compensator. Therefore, the temperature that can be determined by the evaluation unit corresponds to the fuel temperature if the fuel fill level corresponds at least to the height at which the fill level sensor is arranged. If the fill level is below the height of the fill level sensor arrangement, the temperature that can be determined by the evaluation unit corresponds to the fuel vapor temperature. In such a case, in which the fill level is below the height of the fill level sensor arrangement, i.e. the fill level signal is below the fill level threshold, it is also possible for the evaluation unit not to evaluate a temperature signal. This can be practical, for example, if the fuel vapor temperature is not of interest in the particular application.

In another embodiment, it is preferable if the fill level threshold is not oriented to the height of the fill level sensor arrangement, but to the height of the temperature sensor arrangement. In other words, the fill level threshold in this embodiment corresponds to a height of an arrangement of the temperature sensor of the temperature-effect compensator. This is particularly advantageous if the temperature sensor of the temperature-effect compensator is not arranged at the same height as the fill level sensor.

In another preferred embodiment, the selection unit is designed in such a way that when a fill level signal is present that corresponds to a fill level above a first fill level threshold, the selection unit instructs the evaluation unit to determine the fuel temperature from the compensation signal. In this embodiment, the selection unit is also designed in such a way that, if a further fill level signal is present that corresponds to a fill level below a second fill level threshold, the selection unit instructs the evaluation unit to determine the fuel vapor temperature from the compensation signal. Preferably, the first fill level threshold corresponds to a fill level at which the fill level sensor is surrounded by fuel in such a way that only the fuel temperature can be determined. Preferably, the second fill level threshold corresponds to a fill level at which the fill level sensor is surrounded by fuel vapor in such a way that only the fuel vapor temperature can be determined. In other words, the second fill level threshold is lower than the first fill level threshold. In this embodiment, the selection unit is preferably also designed in such a way that, depending on a further fill level signal that corresponds to a fill level between the first and the second fill level thresholds, the selection unit instructs the evaluation unit not to determine a temperature from the compensation signal. This ensures that at a fill level where it is not possible to predict with certainty whether the determinable temperature is the fuel temperature or the fuel vapor temperature, no temperature is determined that might be falsely taken to be the fuel temperature or the fuel vapor temperature. In other words, this embodiment has two different fill level thresholds. Preferably, the two fill level thresholds are determined experimentally or from CAD data and correspond to a designated measurement accuracy for the respective application.

It is advantageous if the selection unit is designed as a digital, analog, or a mixture of a digital and an analog circuit.

In addition, it is advantageous if the selection unit is designed as an integrated circuit, in particular an application-specific integrated circuit. This contributes to the compact design and also reduces the power consumption.

It is particularly advantageous if the selection unit is a data processing device that comprises elements for performing the selection to instruct the evaluation unit to determine the fuel temperature, the fuel vapor temperature, or no temperature from the compensation signal, depending on the fill level signal. It is particularly practical if the selection unit is a data processing device that comprises a processor configured to perform the selection.

The data processing device is preferably the control unit or a microcontroller. In other words, it is particularly advantageous if the data processing device is a device that also serves another purpose and/or performs another function. It is also particularly preferable if the data processing device becomes the selection unit, by a computer program for the selection comprising commands which, when the program is executed by the device, cause the latter to perform the selection.

It is also practical if the computer program for the selection is stored on a computer-readable data carrier. In this case, the data processing device used for the selection, the control unit, or the microcontroller preferably comprises the computer-readable data carrier. Alternatively, it is possible that the data carrier is designed separately from the data processing device used for the selection, the control unit, or the microcontroller. The data carrier is advantageously a freely programmable memory on which different computer programs can be stored, depending on the application, which take into account the arrangement of the fill level sensor in the fuel tank, the fuel tank geometry, or the measurement accuracy of the fill level sensor.

In another preferred embodiment, it is practical if the evaluation unit has one stored characteristic map for each case, which can be used to determine the fuel temperature or fuel vapor temperature to be determined from the compensation signal. In other words, a first characteristic map can be used to derive the fuel temperature from the compensation signal, while a second characteristic map can be used to infer the fuel vapor temperature from the compensation signal. Alternatively, one of the two characteristic maps can be replaced by a corresponding transfer function. It is also conceivable that instead of the two characteristic maps, two different transfer functions can be used to determine the corresponding fuel or fuel vapor temperature by the compensation signal and the evaluation unit. Alternatively, one transfer function and one characteristic map are conceivable. It is preferable to use the selection unit to choose between the two characteristic maps, the two transfer functions, or the characteristic map and the transfer function. As already mentioned, this is preferably carried out depending on the fill level, in particular depending on at least one fill level threshold value.

In other words, in a preferred embodiment it is possible that the selection unit can choose between the two characteristic maps, the two transfer functions, or a map and a transfer function. Depending on which characteristic map or which transfer function is selected by the selection unit, the evaluation unit uses the selected characteristic map or the selected transfer function, wherein the selection is made in particular depending on the fill level, preferably depending on at least one fill level threshold value.

In another preferred embodiment, the selection unit is preferably designed to determine whether the fuel temperature can be determined from the compensation signal depending on a temperature gradient over time. For example, a level below the height of the fill level sensor arrangement may cause momentary contact between the fill level sensor and/or the temperature-effect compensator by allowing the fuel to make momentary contact with the fill level sensor and/or temperature-effect compensator due to swashing movements. This momentary contact can be detected by a corresponding change in the compensation signal within a relatively short period of time. This means that at a fill level below the height of the level sensor arrangement, at a threshold value of a temporal compensation signal gradient, the temperature to be determined corresponds to the fuel temperature. It is advantageous if the temporal change in the compensation signal, i.e. in the temporal compensation signal gradient, corresponds to at least double the frequency of the average duration of such a contact between the fuel and the fill level sensor due to a swashing movement of the fuel. For example, the average duration of such contact between the fuel and the fill level sensor due to the swashing movement of the fuel can be determined experimentally, from CAD data, or based on empirical data.

A preferred exemplary embodiment is characterized in that the fuel delivery device has a swirl pot and that the fill level sensor is arranged inside the swirl pot. This arrangement of the fill level sensor is particularly advantageous because it allows the temperature of the fuel within the swirl pot to be determined. Experiments have shown that the temperature of the fuel in the swirl pot may differ only slightly from the temperature of the fuel outside the swirl pot. Since the fuel contained in the swirl pot is conveyed to the combustion engine, precise regulation and/or control of the electric motor and/or the fuel delivery unit can thus be achieved. In addition, such an arrangement ensures that the fill level sensor is in contact with the fuel in most application states, in particular compared to an arrangement of the fill level sensor outside the swirl pot and inside the fuel tank at the same arranged height, and the fuel temperature can thus be determined. This advantage is brought about by the arrangement of the fill level sensor inside the swirl pot, because the fill level inside the swirl pot is usually higher than outside the swirl pot, as one of the functions of the swirl pot is to prevent the fuel supply pump from running empty. The higher fill level within the swirl pot is caused in particular by its being filled with fuel from the fuel tank using a suction jet pump.

Another preferred exemplary embodiment is characterized in that the fill level sensor is designed to determine the fill level outside the swirl pot. In particular, if the fill level sensor is arranged inside the swirl pot, this ensures on the one hand that the fuel temperature will be determined inside the swirl pot and, at the same time, the fill level in the fuel tank will be determined outside the swirl pot.

A further preferred exemplary embodiment is characterized in that the fill level interacts with a fill level indicator comprising a permanent magnet and a lever, with a float which is attached to the lever and can be used to translate the fill level into a rotation and/or pivoting motion of the permanent magnet by the lever, in such a way that the fill level sensor can be used to determine the fill level of a fuel tank from the magnetic field of the permanent magnet.

It is particularly advantageous if the lever is at least partly wire-shaped. This saves installation space inside the fuel tank, making it possible to use as much of the fuel tank capacity as possible to hold fuel inside the fuel tank, since a lever in the form of a wire has only a very small diameter. At the same time, such a design is particularly cost-effective.

It is also advantageous if the fill level indicator, in the embodiment in which the fill level sensor is located inside the swirl pot, is located partly inside and outside the swirl pot. For example, the fill level indicator can be rotatably or pivotably mounted inside the swirl pot while the float is arranged outside the swirl pot. In such an embodiment, the lever extends from the interior of the swirl pot out of the opening of the swirl pot opposite the bottom of the swirl pot. It is conceivable in this case that the permanent magnet of the fill level indicator is arranged within the swirl pot.

A further preferred exemplary embodiment is characterized in that the fill level indicator is arranged outside the swirl pot. It is particularly advantageous if the fill level sensor is arranged inside the swirl pot, while the fill level indicator is arranged outside, in particular completely, i.e. exclusively outside, the swirl pot. The permanent magnet of the fill level indicator can thus interact with the fill level sensor in the swirl pot through the swirl pot wall, in such a way that on the one hand the fuel temperature is determined within the swirl pot and on the other hand the fill level in the fuel tank is measured outside the swirl pot. With such an arrangement, no complex shaping of the lever is necessary to allow the lever to protrude from the swirl pot, which significantly reduces the assembly and the costs, in particular for the lever.

A further preferred exemplary embodiment is characterized in that the fill level sensor and/or the fill level indicator is/are attached to the swirl pot. It is particularly advantageous if the swirl pot has a receptacle on the inner side for the fill level sensor, in which the fill level sensor is mounted. It is also advantageous if the swirl pot has a receptacle on the outer side for the fill level indicator, in which the fill level indicator is mounted. It is particularly advantageous if the fill level indicator can be rotatably mounted in the receptacle. In addition, it is practical if the permanent magnet of the fill level indicator is arranged in such a way that it is intersected by the axis about which the fill level indicator is rotatably mounted. In this way, the permanent magnet performs a relatively small movement over the entire measurement range of the fill level sensor, which enables the fill level sensor to detect the magnetic field of the permanent magnet over the latter's entire movement. This results in an extremely compact design of the fill level sensor. In addition, it is particularly advantageous if the fill level sensor is arranged at a point on the inner side of the swirl pot that corresponds to a rotation or pivoting range of the permanent magnet on the outer side of the swirl pot. In this case the permanent magnet and the fill level sensor are matched to each other in such a way that the fill level sensor can detect the movement of the permanent magnet outside the swirl pot through the swirl pot wall.

A further advantageous embodiment is characterized in that the evaluation unit is integrated into the control unit or the fill level sensor.

A further advantageous embodiment is characterized in that the fuel delivery device comprises a monitoring unit which monitors the functionality of the fill level sensor, the fill level indicator, the selection unit, the temperature sensor, and and/or the evaluation unit and that a status signal can be generated by the monitoring unit depending on the functionality.

In general, the monitoring unit is designed in such a way that it can monitor the functionality of the fill level sensor, the fill level indicator, the selection unit, the temperature sensor, and/or the evaluation unit, i.e. that the monitoring unit can detect a malfunction or a defect of the fill level sensor, the fill level indicator, the selection unit, the temperature sensor, and/or the evaluation unit and can generate a specific status signal depending on whether the fill level sensor, the fill level indicator, the selection unit, the temperature sensor, and/or the evaluation unit show a defect or a malfunction. The specific status signal can advantageously be used to evaluate whether the fill level sensor, the fill level indicator, the selection unit, the temperature sensor, or the evaluation unit show a defect or a malfunction. It is particularly practical if the status signal can also be used to evaluate the fault type. For example, the status signal can contain one or more specific error codes assigned to specific fault types. For example, the monitoring by the monitoring unit can reveal that no fill level signal is output. From this, it can be concluded, for example, that the fill level indicator is no longer interacting with the fill level sensor or that the power supply has been interrupted. It is also possible to use the monitoring unit to check the fill level signal and/or the compensation signal for plausibility in order to find out whether the fill level sensor is functioning correctly. For example, the respective signals must be within certain absolute values that correspond to the plausible minimum and maximum values, for example, the fill levels when the fuel tank is empty or full, or must only be below certain signal rates of change in order to be plausible.

Besides this, it is advantageous if the monitoring unit is designed as a digital, analog, or a mixture of a digital and analog circuit.

In addition, it is advantageous if the monitoring unit is designed as an integrated circuit, in particular an application-specific integrated circuit. This contributes to the compact design and also reduces the power consumption.

It is particularly advantageous if the monitoring unit is a data processing device that comprises elements for monitoring the functionality of the fill level sensor, the fill level indicator, the selection unit, the temperature sensor, and/or the evaluation unit as well as elements for generating the status signal. It is particularly practical if the evaluation unit is a data processing device that comprises a processor configured to perform the monitoring and generate the status signal.

The data processing device used for the monitoring and for generating the status signal is preferably the control unit or a microcontroller. In other words, it is particularly advantageous if the data processing device used for the monitoring and for generating the status signal is a device that also serves another purpose and/or performs another function. It is also particularly preferable if the data processing device becomes the monitoring unit, by virtue of the fact that a computer program used for the monitoring and for generating the status signal comprises commands which, when the program is executed by the device, cause the latter to monitor the functionality of the fill level sensor, the fill level indicator, the selection unit, the temperature sensor, and/or the evaluation unit and to generate a status signal.

It is also practical if the computer program for the monitoring and for generating the status signal is stored on a computer-readable data carrier. In this case, the data processing device used for the monitoring and for generating the status signal, the control unit, or the microcontroller, preferably comprises the computer-readable data carrier. Alternatively, it is possible that the data carrier is designed separately from the data processing device used for the monitoring and for generating the status signal, the control unit, or the microcontroller. The data carrier is advantageously a freely programmable memory on which different computer programs for the monitoring and for generating the status signal can be stored depending on the application, in order to implement various monitoring functions.

A further advantageous embodiment is characterized in that the fuel delivery device comprises a diagnostic interface via which the status signal can be output.

This diagnostic interface is preferably designed as an OBD interface. Furthermore, the diagnostic interface is preferably designed in such a way that the status signal can be transmitted to the control unit. The status signal can advantageously be saved, i.e. stored, in the control unit. It is particularly advantageous if status signals stored in the control unit can be read out, for example, using a diagnostic device. It is particularly practical if the status signal comprises attributes such as time of day and/or date for this purpose.

Such a diagnostic device can be connected, for example, via a diagnostic interface in the form of an OBD connection which is located in the interior of most motor vehicles. Alternatively, a connection for a diagnostic device, i.e. a diagnostic interface, is preferably provided on the side of the flange facing away from the inside of the fuel tank, i.e. on the outside of the flange.

A further advantageous embodiment is characterized in that the fuel delivery device has at least one analog-to-digital converter which can convert the fill level signal, the compensation signal, the status signal, and/or a temperature signal that can be generated by the evaluation unit, from an analog signal into a digital signal. This allows the fill level signal, the compensation signal, the status signal and/or the temperature signal generated by the evaluation unit to be routed to one or more digital inputs of the control unit.

Alternatively, it is possible that the corresponding signals are routed in analog form to one or more analog inputs of the control unit without the need for an analog-to-digital converter.

This makes it possible to gain individual access to the available inputs of the available control unit.

In each of the designs it is preferable that at least one, preferably a plurality or all of the device units, i.e. temperature-effect compensator, evaluation unit, selection unit and monitoring unit, is or are designed as an analog circuit, a digital circuit or a mixture of a digital and an analog circuit. It is particularly preferable if two, three or all of the device units are implemented on the same circuit or integrated into the same circuit.

It is particularly preferable if at least one, preferably a plurality or all of the device units is or are designed as an integrated circuit, as an application-specific integrated circuit, as a data processing device and/or as a microcontroller. It is particularly preferable if two, three, or all of the device units are implemented on the same integrated circuit, as an application-specific integrated circuit, as a data processing device and/or as a microcontroller.

It is also particularly preferable if the evaluation unit, the selection unit, and/or the monitoring unit is or are integrated into the control unit.

The temperature sensor and/or the magnetoresistive fill level sensor are preferably integrated into or connected to one of the device units.

It is practical if at least two of the computer programs for generating a compensation signal, for the evaluation, the selection and/or the monitoring are stored on the same memory. However, it is also practical if at least one of these computer programs is stored on a separate memory. It is also practical if a single computer program comprises the commands for generating a compensation signal, for the selection, the evaluation, and/or the monitoring.

The object relating to the fuel tank is achieved by providing a fuel tank having a fuel delivery device according to the invention. It is particularly advantageous if the fuel tank is characterized in that the fill level sensor is arranged in a region of the fuel tank which corresponds to a maximum fill level of the fuel tank of 10%. This ensures, in particular in an embodiment in which the fill level sensor is arranged outside the swirl pot, that the fill level sensor is in thermal conductive contact with fuel in almost every operating situation, so that the fuel temperature can be determined.

It is also particularly advantageous if the fill level sensor is arranged in a region of the fuel tank that corresponds to a reserve fill level of the fuel tank. As the driver of a motor vehicle normally drives to the nearest filling station right away when the fuel indicator shows that the level in the tank has reached the reserve level, it can be reliably ensured that the operating conditions in which the fuel temperature cannot be determined are reduced to a negligible minimum.

It is also advantageous if the fill level sensor is arranged on the bottom or near the bottom of the swirl tank or the fuel tank. This ensures that as long as there is fuel in the swirl pot or fuel tank, the fill level sensor is in thermally conductive contact with fuel, so that the fuel temperature can be determined.

A further preferred exemplary embodiment is characterized in that the fill level sensor is designed in such a way that the fill level signal, the compensation signal, the status signal and/or a temperature signal generated by the evaluation unit can be transmitted sequentially or simultaneously via a common electrical cable to the control unit and/or from the fuel tank. This eliminates the need for an additional cable to transmit the temperature signal or the compensation signal, since the electrical cable of the fill level signal can be used for the transmission.

It is particularly advantageous if, depending on the operating state, either the compensation signal or the temperature signal is transmitted to the control unit and/or from the fuel tank more often than the fill level signal, or vice versa. For example, during a warm-up phase of an internal combustion engine of a motor vehicle, if the fuel level is sufficient the continuous change in the fuel temperature in the fuel tank, which takes place in particular during the warm-up phase of an internal combustion engine, can play a more important role for regulating the fuel delivery device than in an operating state in which the combustion engine has already attained its operating temperature or the fuel in the fuel tank has already attained a relatively constant fuel temperature, i.e. is undergoing a lower rate of temperature change.

The object with regard to the method is achieved by providing a method for determining the temperature of a fluid inside a fuel tank, which comprises the following steps:

arranging a magnetoresistive fill level sensor inside a fuel tank; generating a compensation signal by a temperature-effect compensator to compensate for temperature-related influences on a fill level signal generated by the fill level sensor; determining the temperature of a fluid surrounding the fill level sensor by evaluating the compensation signal using an evaluation unit.

Preferably, the device used to carry out this method is the fuel delivery device according to the invention.

A further preferred embodiment is characterized in that only the fuel temperature is determined by the evaluation unit if a fill level signal is present that corresponds to a fill level at least at the height of the arrangement of the fill level sensor.

Another preferred embodiment is characterized in that only the fuel vapor temperature is determined by the evaluation unit if a fill level signal is present that corresponds to a fill level below the height of the arrangement of the fill level sensor.

Another preferred embodiment is characterized in that a method is provided for controlling and/or regulating an electric motor for driving a fuel delivery device, which comprises the steps of the method according to the invention, wherein the evaluation unit generates a temperature signal as a function of the compensation signal and that a control unit controls and/or regulates an electric motor, which drives a tank-internal fuel delivery device, as a function of the temperature signal. For example, depending on the temperature signal, it is possible to choose between a normal operating procedure and a cold start operating procedure to control and/or regulate the electric motor. Preferably, the cold start operating procedure is a procedure for operating the electric motor with a lower efficiency than the normal operating procedure. This produces a targeted heating of the fuel at low ambient temperatures due to the intentionally generated waste power. In particular, the cold start operating procedure is only selected when the fuel temperature falls below a certain fuel temperature threshold and otherwise the normal operating procedure is used. The duration of the use of the cold start operating procedure is preferably linked to a specified time period and/or to the attainment of a specified fuel temperature threshold. When the fuel temperature threshold is reached and/or the time period has expired, it is preferable to switch from the cold start operating procedure to the normal operating procedure. Alternatively or in addition, this method may also be used to control and/or regulate a high-pressure fuel pump, a supply valve, in particular electromechanical, of a high-pressure fuel pump unit, at least one fuel injection nozzle of an internal combustion engine and/or a heating device for heating fuel, a method for the warm-up phase of an internal combustion engine and/or a cooling device for cooling fuel.

A further preferred embodiment is characterized in that a method for controlling and/or regulating an injection of fuel vapors to a combustion process of an internal combustion engine is provided, which comprises the steps of the method according to the invention, wherein the evaluation unit generates a temperature signal as a function of the compensation signal and that a control unit controls and/or regulates the injection of fuel vapors from the fuel tank to the combustion process of an internal combustion engine as a function of the temperature signal.

Alternatively or in addition, this method can be used to control and/or regulate an injection of fuel vapors into an activated carbon container.

A further aspect of the invention relates to the use of a compensation signal to compensate for temperature-related influences on a fill level signal generated by a magnetoresistive fill level sensor. The use of this signal is characterized in that the fuel temperature is determined in order to regulate and/or control an electromotively driven fuel delivery device as a function of the fuel temperature.

BRIEF DESCRIPTION OF THE DRAWINGS

Aspects of the invention will be explained in more detail in the following by exemplary embodiments with reference to the drawings. In the drawings.

DETAILED DESCRIPTION OF THE PRESENTLY PREFERRED EMBODIMENTS

Figure 1:
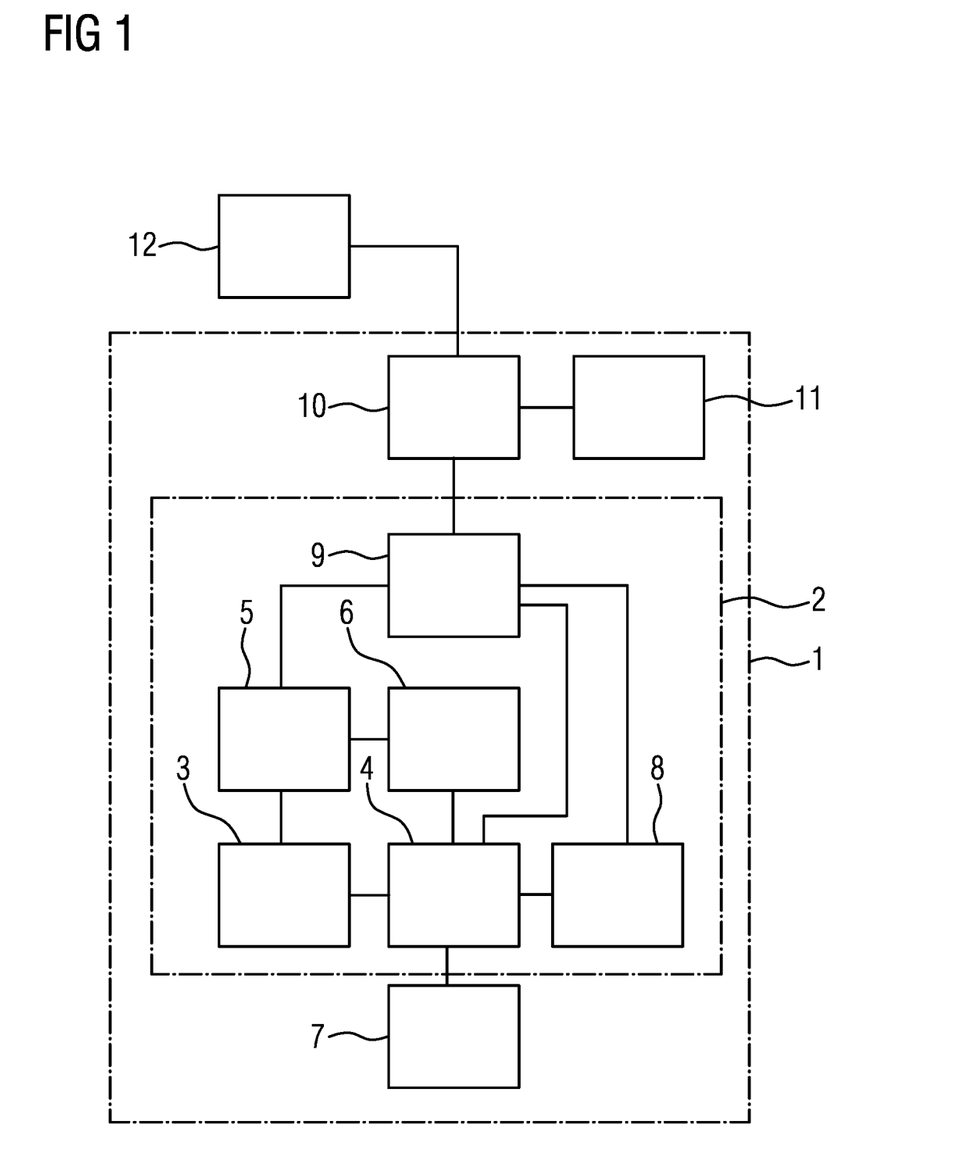
FIG. 1 is a block diagram of the fuel delivery device.

FIG. 1 shows a schematic block diagram, which represents a preferred embodiment of the fuel delivery device 1 according to one aspect of the invention. The fuel delivery device 1 comprises an application-specific integrated circuit (ASIC) 2, which comprises a temperature-effect compensator 3, a magnetoresistive fill level sensor 4, an evaluation unit 5, a selection unit 6, a monitoring unit 8, and an analog-to-digital converter 9. In addition, the fuel delivery device 1 comprises a fill level indicator 7 that interacts with the magnetoresistive fill level sensor 4 by a float, a lever and a permanent magnet, in such a way that the fill level inside a fuel tank can be measured. The fuel delivery unit 1 also comprises a control unit 10 and an electric motor 11 that can be regulated and/or controlled by the control unit 10. The control unit 10 is connected to a diagnostic interface 12 in the form of an OBD interface, to which a diagnostic device can be connected. The magnetoresistive fill level sensor 4, which interacts with the fill level indicator 7, generates a fill level signal which is typically influenced by the ambient temperature of the fill level sensor 4. The magnetoresistive fill level sensor 4 is predominantly surrounded by fuel. To compensate for the temperature-related influences on the fill level signal of the fill level sensor 4, a temperature-effect compensator 3 is provided. The evaluation unit 5 uses the compensation signal that can be generated by the temperature-effect compensator 3 to determine the fuel temperature. The fuel temperature is transmitted in the form of a fuel temperature signal to the analog-to-digital converter 9, which transmits the signal to a digital input of the control unit 10, where it is received and further used to regulate the electric motor 11. In addition, the fill level sensor 4 transmits a fill level signal to the analog-to-digital converter 9, which converts the fill level signal into a digital signal and transmits it to the same digital input of the control unit 10 where it can be further processed. The fill level sensor 4 also transmits its fill level signal to a selection unit 6, wherein the selection unit 6 causes the evaluation unit 5 to determine the fuel temperature or the fuel vapor temperature based on a fill level threshold. The fill level threshold corresponds to a fill level above which the level sensor 4 is predominantly surrounded by fuel and below which the fill level sensor 4 is predominantly surrounded by fuel vapor. In this way, depending on the level, either the fuel temperature or the fuel vapor temperature can be determined by the evaluation unit 5.

In addition, the monitoring unit 8 monitors the functionality of the fill level sensor 4 and, depending on the functionality of the fill level sensor 4, transmits a status signal to the analog-to-digital converter 9, which converts the status signal into a digital signal and forwards it to the same digital input of the control unit 10, where it can be further processed, forwarded, or stored. For example, a status signal stored in this way can be retrieved and evaluated on the control unit 10 by a diagnostic device via the OBD interface 12.

Figure 2:
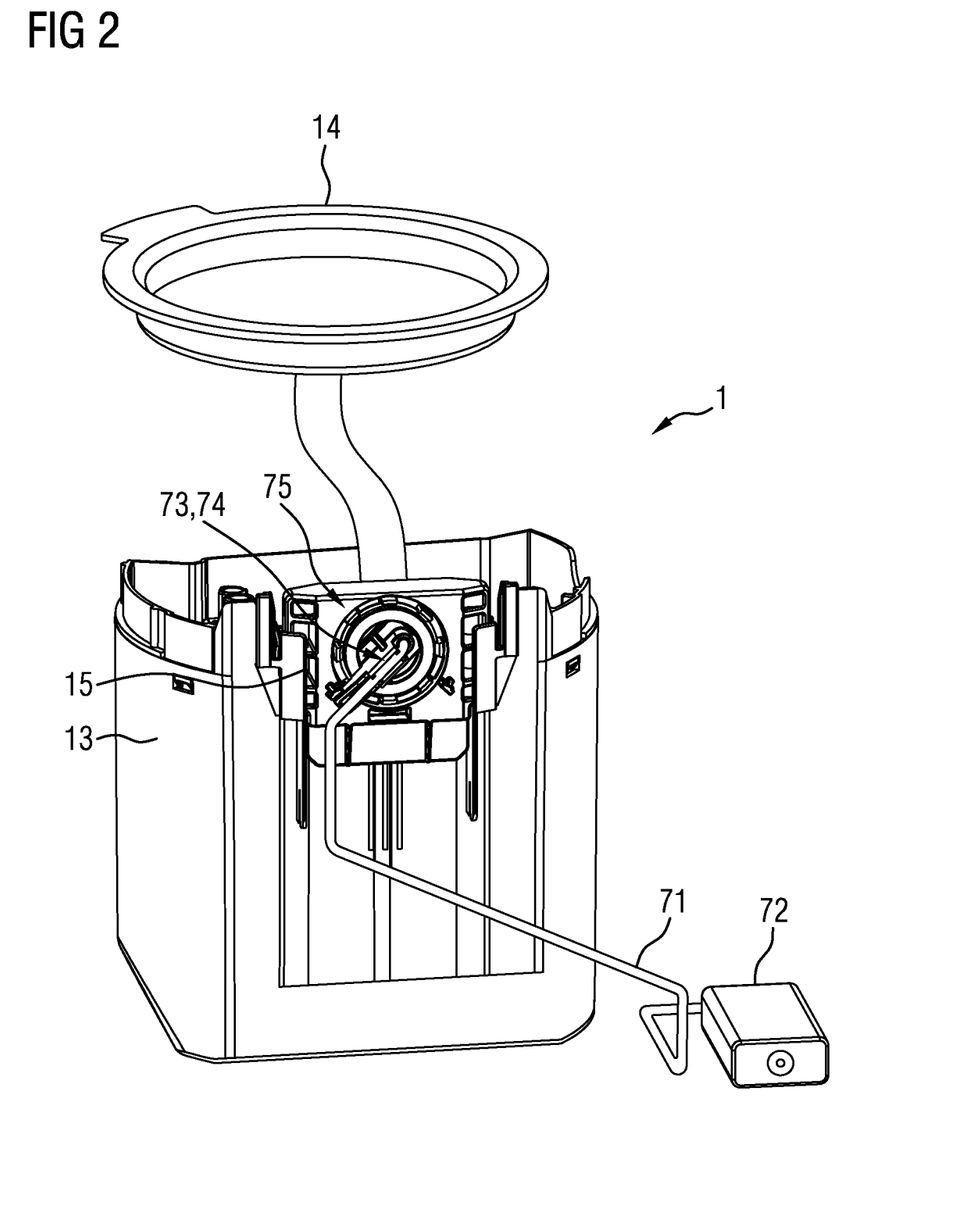
FIG. 2 is the fuel delivery device according to FIG. 1.

FIG. 2 shows the embodiment of the fuel delivery device 1 according to one aspect of the invention shown in FIG. 1. The fuel delivery device 1 has a flange 14 in which the control unit is accommodated in a fluid-tight manner, i.e. protected against fuel and fuel vapor. In addition, the fuel delivery device 1 comprises a swirl pot 13, which has a receptacle 15, formed in one piece with the swirl pot 13 by plastic injection molding, for the mounting 75 of the fill level indicator 7. The fill level indicator 7 of the fuel delivery device 1 comprises a float 72, a lever 71, and a permanent magnet 73. The permanent magnet 73 is received in a receptacle 74 for the permanent magnet and interacts with the fill level sensor in such a way that the fill level within a fuel tank can be measured using the position of the fill level indicator 7. The permanent magnet 73 is encapsulated in a receptacle for the permanent magnet 73. The fill level sensor is also arranged on the outside of the swirl pot 13. The sensor can also be arranged on the inside of the swirl pot 13. In the sensor is arranged inside the swirl pot 13 it is possible to determine the fuel temperature inside the swirl pot 13, while if the fill level sensor is arranged outside the swirl pot 13 the fuel temperature outside the swirl pot 13 can be determined. The selection unit is responsible for instructing the evaluation unit to determine either the fuel temperature or the fuel vapor temperature, depending on the fill level.

Figure 3A:
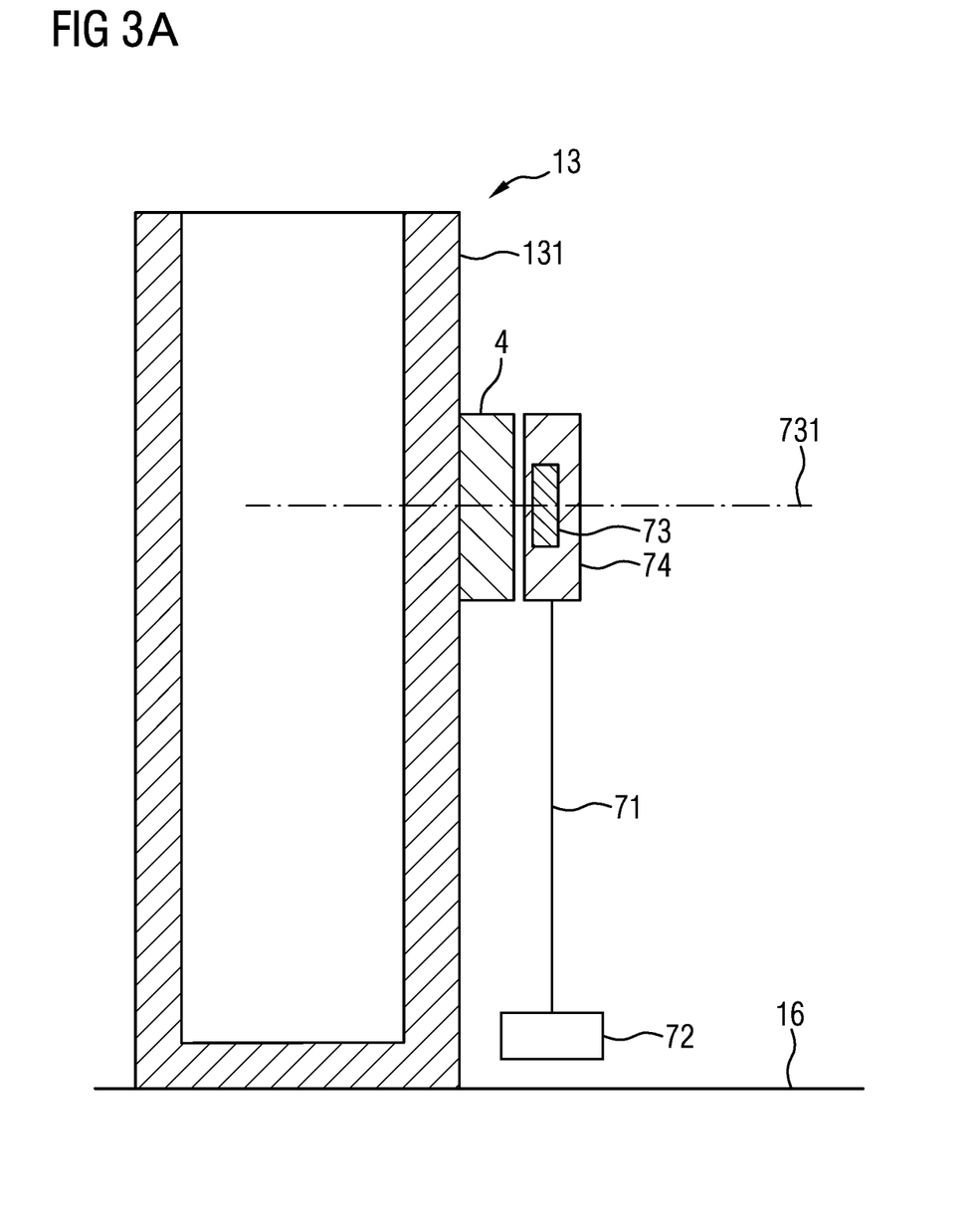
FIG. 3A is a schematic illustration of the fuel delivery device shown in FIG. 2.

FIG. 3A shows a schematic illustration of the embodiment of the fuel delivery device according to the invention from FIG. 2. The swirl pot 13 is arranged on the fuel tank bottom 16. The magnetoresistive fill level sensor 4 is located on an outer wall surface 131 of the swirl pot 13, wherein the fill level indicator, i.e. the float 72, the lever 71, and the permanent magnet receptacle 74 with the permanent magnet 73, is also arranged outside the swirl pot 13. The permanent magnet 73 is completely enclosed in the permanent magnet receptacle 74 by plastic injection molding and is therefore protected against fuel. The fill level indicator is mounted on the swirl pot outer wall surface 131 in such a way that the permanent magnet 73 performs a purely rotational movement about a rotational axis 731 when the float 72 transmits a change in the fuel level in the fuel tank to the permanent magnet receptacle 74 with the permanent magnet 73 by the lever 71. In addition, the rotational axis 731, about which the permanent magnet 73 can execute a purely rotary motion, penetrates the magnetoresistive fill level sensor 4.

Figure 3B:
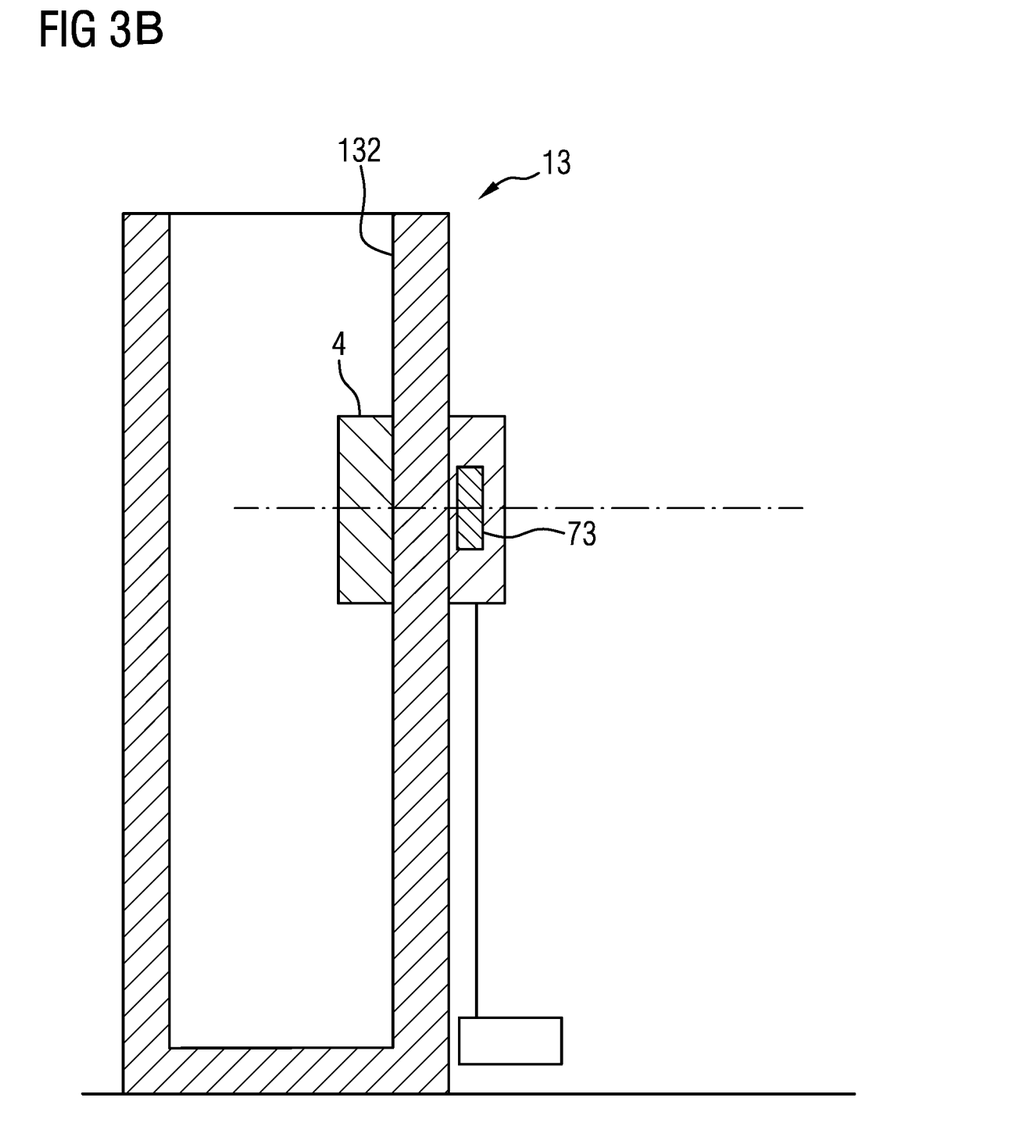
FIG. 3B is a schematic illustration of a fuel delivery device according to FIG. 1.

FIG. 3B shows a further schematic illustration of another embodiment of the fuel delivery device according to one aspect of the invention from FIG. 1. The embodiment shown in FIG. 3B differs from the embodiment of FIG. 3a in that the fill level sensor 4 in this embodiment is arranged on a swirl pot inner wall surface 132 of the swirl pot 13. This means that the magnetic field of the permanent magnet 73 penetrates the swirl pot wall and thus interacts with the fill level sensor 4. In other words, this arrangement allows the fuel temperature within the swirl pot 13 to be measured. At the same time, it is ensured that the fill level sensor 4 is in contact with the fuel in the swirl pot 13 for heat transfer in almost every operating state, because the fuel fill level in the swirl pot 13 is usually higher and is subject to fewer fluctuations than outside the swirl pot 13.

Figure 3C:
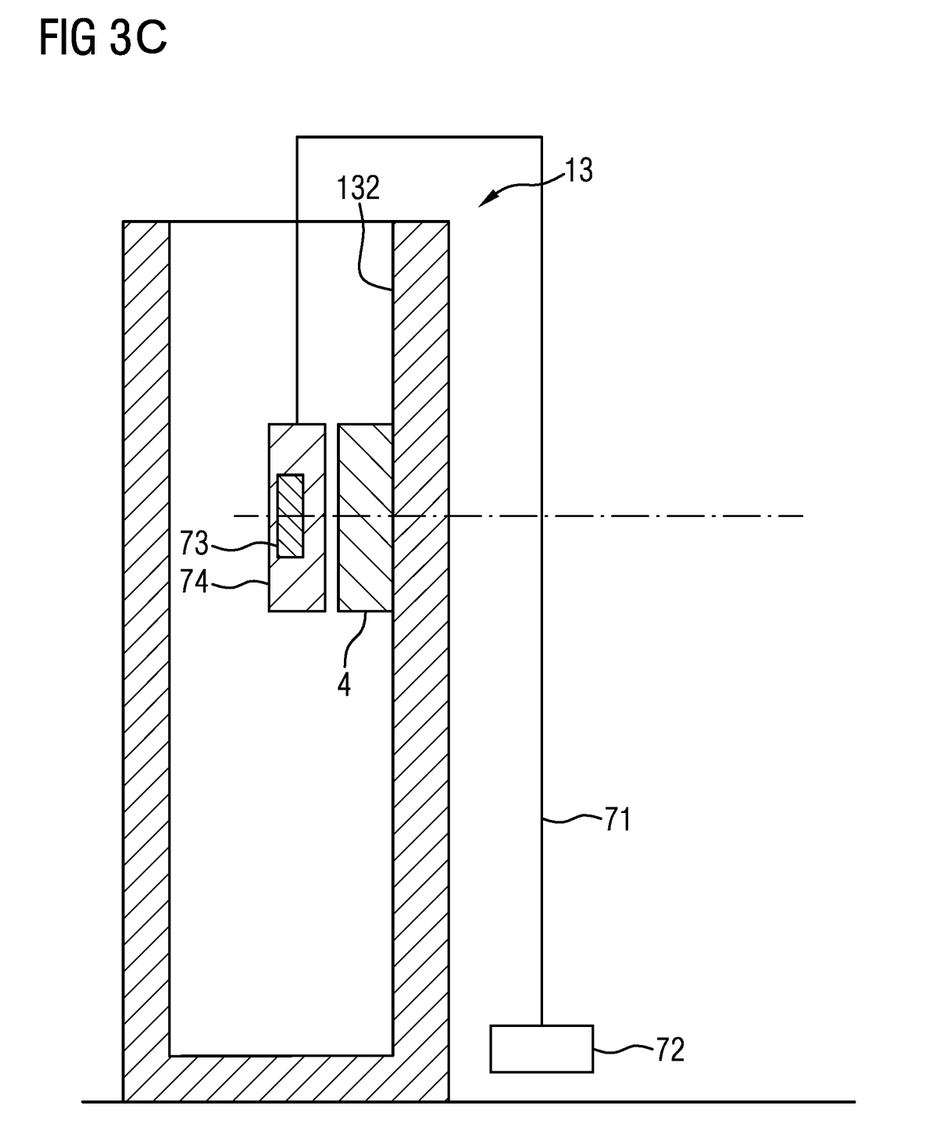
FIG. 3C is a schematic illustration of the fuel delivery device shown in FIG. 1.

FIG. 3C shows a further schematic illustration of another embodiment of the fuel delivery device according to the invention from FIG. 1. This embodiment differs from the embodiment which is shown in FIG. 3b in that not only the fill level sensor 4 but also the permanent magnet receptacle 74 with the permanent magnet 73 is arranged on the swirl pot inner wall surface 132. For this purpose, the lever 71 is fed out from the inside of the swirl pot 13 to the float 72 arranged outside the swirl pot 13. Compared to the design shown in FIG. 3b, a permanent magnet 73 with a weaker magnetic field can be used in this case, since the magnetic field of the permanent magnet 73 in this embodiment does not need to penetrate the swirl pot wall in order to interact with the fill level sensor 4. At the same time, however, a more elaborate shape of the lever 71 and more installation space are required for the pivoting of the lever 71.

The exemplary embodiments in FIGS. 1 to 3C are in particular not of a limiting nature and serve to illustrate the idea of the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fuel delivery device comprising:
 a pumping stage;
 an electric motor configured to drive the pumping stage;
 a control unit;
 a magnetoresistive fill level sensor configured to generate a fill level signal, having a temperature-effect compensator by which a compensation signal is generated to compensate for temperature-related influences on the fill level signal; and
 an evaluation unit configured to determine a temperature of a fluid surrounding the fill level sensor based at least in part on the compensation signal.

2. A fuel delivery device, comprising:
 a pumping stage;
 an electric motor configured to drive the pumping stage;
 a control unit;
 a magnetoresistive fill level sensor configured to generate a fill level signal, having a temperature-effect compensator by which a compensation signal is generated to compensate for temperature-related influences on the fill level signal;
 an evaluation unit configured to determine a temperature of a fluid surrounding the fill level sensor based at least in part on the compensation signal; and a selection unit, configured to instruct the evaluation unit to determine a fuel temperature, a fuel vapor temperature, or no temperature from the compensation signal, depending on the fill level signal.

3. The fuel delivery device as claimed in claim 2, wherein the selection unit is configured such that:

when the fill level signal corresponds to a fuel fill level at least at a height of an arrangement of the fill level sensor, the evaluation unit is instructed to determine the fuel temperature from the compensation signal; and when the fill level signal corresponds to a fuel fill level below a position of the fill level sensor, the evaluation unit is instructed to determine the fuel vapor temperature from the compensation signal, or not to determine a temperature.

4. The fuel delivery device as claimed in claim 1, further comprising:

a swirl pot, wherein the fill level sensor is arranged within the swirl pot.

5. The fuel delivery device as claimed in claim 4, wherein the fill level sensor is configured to determine a fill level outside the swirl pot.

6. The fuel delivery device as claimed in claim 1, wherein the fill level sensor interacts with a fill level indicator comprising:

a permanent magnet;

a lever; and a float attached to the lever that translates a fill level into a rotation and/or pivoting motion of the permanent magnet by the lever such that the fill level sensor determines the fill level of a fuel tank from a magnetic field of the permanent magnet.

7. The fuel delivery device as claimed in claim 4, wherein a fill level indicator is arranged outside of the swirl pot.

8. The fuel delivery device as claimed in claim 4, wherein at least one of a fill level sensor and a fill level indicator is attached to the swirl pot.

9. The fuel delivery device as claimed in claim 1, wherein the evaluation unit is integrated into the control unit or the fill level sensor.

10. The fuel delivery device as claimed in claim 2, further comprising:

a monitoring unit which monitors a functionality of the fill level sensor, a fill level indicator, the selection unit and/or the evaluation unit and generates a status signal depending on the functionality.

11. The fuel delivery device as claimed in claim 10, further comprising a diagnostic interface via which the status signal can be output.

12. The fuel delivery device as claimed in claim 1, further comprising:

at least one analog-to-digital converter that converts the fill level signal, the compensation signal, and/or a temperature signal generated by the evaluation unit from an analog signal into a digital signal.

13. A fuel tank having a fuel delivery device as claimed in claim 1, wherein the fill level sensor is arranged in a region of a fuel tank which corresponds to a maximum fill level of the fuel tank of 10%.

14. The fuel tank as claimed in claim 3, wherein the fill level sensor is configured such that the fill level signal, a status signal, the compensation signal and/or a temperature signal generated by the evaluation unit is transmitted sequentially or simultaneously via a common electrical cable to the control unit and/or from the fuel tank.

15. A method for determining the temperature of a fluid inside a fuel tank, comprising:

arranging a magnetoresistive fill level sensor inside a fuel tank;

generating a compensation signal by a temperature-effect compensator to compensate for temperature-related influences on a fill level signal generated by the fill level sensor; and determining the temperature of a fluid surrounding the fill level sensor by evaluating the compensation signal using an evaluation unit.

16. The method according to claim 15, wherein only a fuel temperature is determined by the evaluation unit if the fill level signal corresponds to a fuel fill level at least at a height of the arrangement of the fill level sensor.

17. The method according to claim 16, wherein only a fuel vapor temperature is determined by the evaluation unit if the fill level signal corresponds to a fill level below the height of the arrangement of the fill level sensor.

18. The method according to claim 16, wherein the evaluation unit generates a temperature signal depending on the compensation signal and that a control unit controls and/or regulates an electric motor that drives a tank-internal fuel delivery device depending on the temperature signal.

19. The method according to claim 15, wherein the evaluation unit generates a temperature signal as a function of the compensation signal and that a control unit controls and/or regulates an injection of fuel vapors from the fuel tank to a combustion process of an internal combustion engine as a function of the temperature signal.

* * * * *